(12) United States Patent
Specht et al.

(10) Patent No.: US 6,439,494 B1
(45) Date of Patent: *Aug. 27, 2002

(54) SEAT BELT RETRACTOR

(75) Inventors: Martin Specht, Feldafing; Christian Liedl, München, both of (DE)

(73) Assignee: Breed Automotive Technology, Inc., Lakeland, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/706,064

(22) Filed: Nov. 3, 2000

(30) Foreign Application Priority Data

Dec. 13, 1999 (DE) .......................... 199 59 956

(51) Int. Cl.[7] .............................. B65H 75/48
(52) U.S. Cl. .................................. 242/379.1
(58) Field of Search ................. 242/379.1, 375.1, 242/375.3; 297/478

(56) References Cited

U.S. PATENT DOCUMENTS

| 4,529,143 | A | * | 7/1985 | Kanada et al. | 242/107 |
|---|---|---|---|---|---|
| 4,588,144 | A | * | 5/1986 | Nishimura | 242/107 |
| 5,522,564 | A | * | 6/1996 | Schmidt et al. | 242/374 |
| 5,526,996 | A | * | 6/1996 | Ebner et al. | 242/374 |
| 5,799,893 | A | * | 9/1998 | Miller, III et al. | 242/379.1 |
| 5,820,056 | A | * | 10/1998 | Dybro et al. | 242/374 |
| 5,895,002 | A | * | 4/1999 | Sasaki et al. | 242/374 |
| 6,012,667 | A | * | 1/2000 | Clancy, III et al. | 242/379.1 |
| 6,029,924 | A | * | 2/2000 | Ono et al. | 242/379.1 |
| 6,290,159 | B1 | * | 9/2001 | Specht et al. | 242/379.1 |
| 6,311,918 | B1 | * | 11/2001 | Specht | 242/382 |
| 6,318,664 | B1 | * | 11/2001 | Sumiyashiki | 242/379 |

FOREIGN PATENT DOCUMENTS

| DE | 4302042 | * | 7/1994 |
|---|---|---|---|
| DE | 19647841 | * | 5/1998 |
| DE | 19731689 | * | 2/1999 |
| DE | 19940034 | | 8/1999 |
| DE | 19950855 | | 10/1999 |
| DE | 19927731 | | 12/1999 |
| DE | 19927731 | * | 12/2000 |
| EP | 1022201 | * | 12/1999 |
| JP | 10167002 | * | 6/1998 |

* cited by examiner

Primary Examiner—Donald P. Walsh
Assistant Examiner—Joseph C Rodriguez
(74) Attorney, Agent, or Firm—Jarett Rieger; Lonnie Drayer

(57) ABSTRACT

A seat belt retractor has a belt reel mounted rotatably around a reel axis on a retractor frame and biased by a motive spring. A load limiter is non-rotatably connected to a rotatable spool of the belt reel. A rotor can be coupled to the belt reel and/or its load limiter by a coupling. The coupling is supported against axial displacement on an adapter flange connected rigidly to the retractor frame. The rotor transmits a torque generated by an electric motor.

14 Claims, 5 Drawing Sheets

SEAT BELT RETRACTOR

FIELD OF THE INVENTION

The invention relates to a seat belt retractor.

DISCUSSION OF THE PRIOR ART

In a seat belt retractor described in DE 199 27 731 A1, the rotor transmits the torque of an electric motor to the belt reel and/or the load limiter. The rotor is a planet wheel carrier of a planetary gear connected between the electric motor and the belt reel or the force limiter. A suitable mounting for this rotor is described in DE 199 40 034 A1, the rotor being mounted with a bearing collar externally in a cylindrical outer bearing formed on an adapter flange connected rigidly to the frame. Internally, the rotor is mounted on a bearing journal extending coaxially to the reel axis.

DE 199 50 855 A1 describes a seat belt retractor in which the rotor serves to transmit a torque, resulting from an inertial force, onto the belt reel and/or the load limiter.

With a seat belt retractor of this type, high forces are transmitted via the coupling via the rotor onto the belt reel or the load limiter, in particular in the event of a crash.

DE 199 40 034 A1 describes a rotor that is mounted externally in a cylindrical external bearing formed on an adapter flange connected non-rotatably to the frame.

BRIEF DESCRIPTION OF THE DRAWINGS

Embodiments of the invention will be described in more detail with reference to the figures, in which.

DETAILED DESCRIPTION OF THE INVENTION

Figure 1:
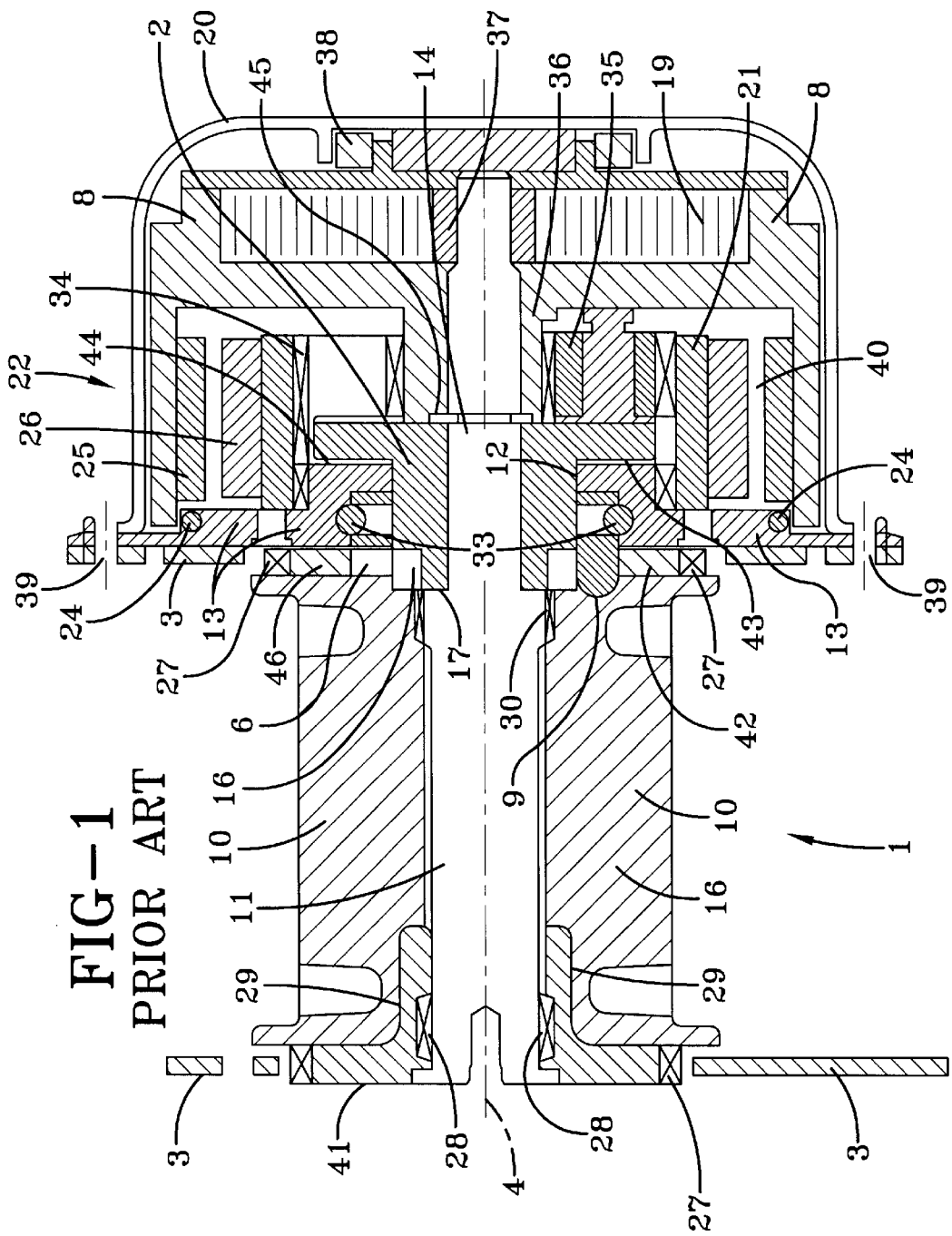
FIG. 1 is a cross-sectional view of a first embodiment of a seat belt retractor.

The seat belt retractors shown in the embodiments have a belt reel 1 that is mounted rotatably around a reel axis 4 in a retractor frame 3. During normal vehicle operation the belt reel 1 is biased in the belt winding direction by a motive spring 19, as will be described in detail hereinafter. A seat belt 5 (FIG. 2) is wound onto the belt reel 1.

Figure 2:
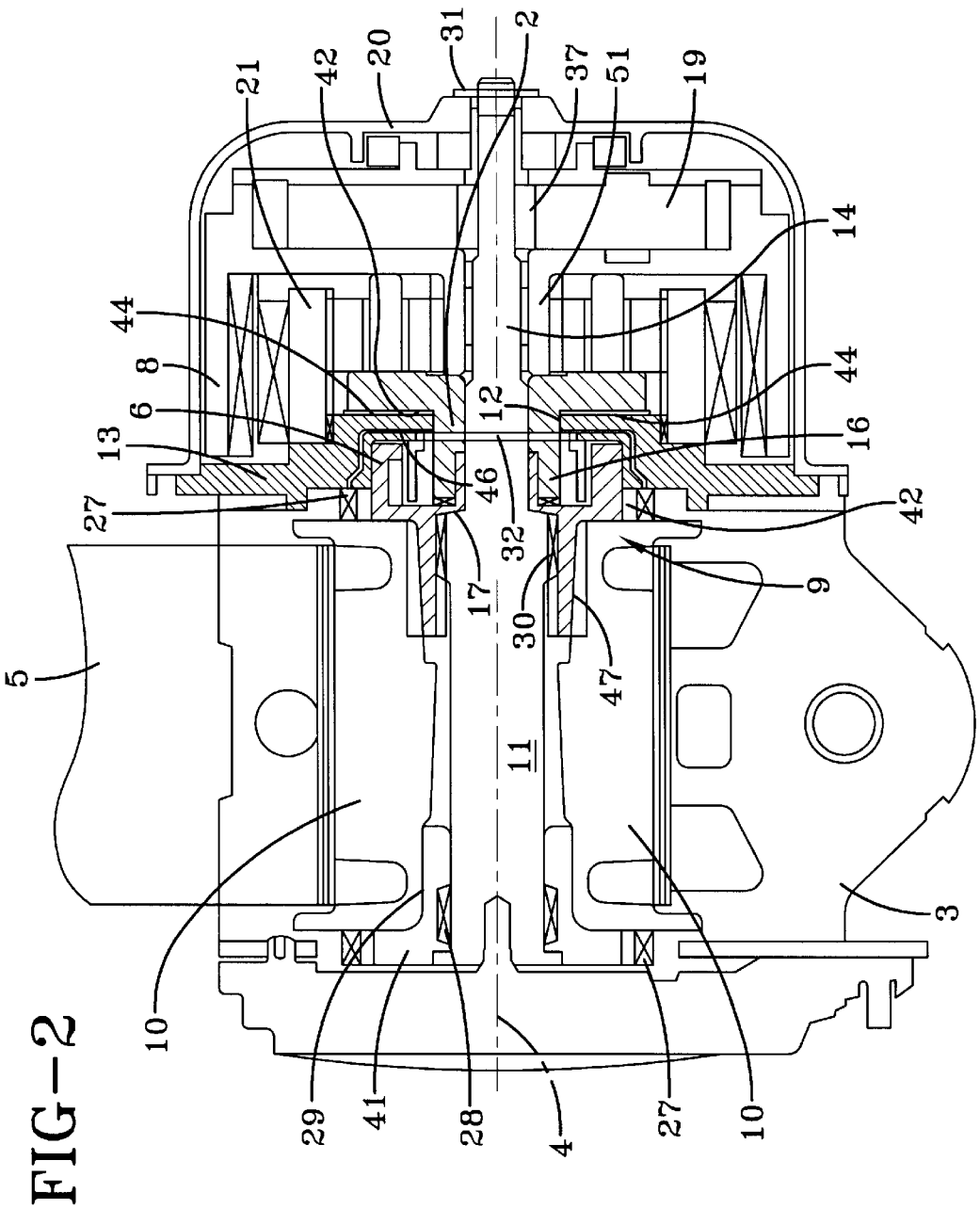
FIG. 2 is a cross-sectional view of a second embodiment of a seat belt retractor.

The belt reel 1 comprises a rotatable spool 10 on whose reel body the seat belt 5 is wound, as shown schematically in FIG. 2. At its two end faces, the belt reel 1 has blocking discs 41 that carry blocking teeth 27 at their periphery. Blocking means, for example blocking latches, by which the blocking discs 41 are supported non-rotatably on the retractor frame 3, can be brought into engagement with the blocking teeth 27 for blocking the belt reel 1 against further rotation.

This blocking is sensor-induced, for example in the event of a crash. To limit the loading of the seat belt 5, secured by the blocked belt reel 1, on the body of the strapped-in person, a load limiter 11 in the form of a torsion bar extends through the interior of the hollow reel body. The load limiter 11 is connected non-rotatably to the left-hand blocking disc 41 via a fixed bearing 28. At its right-hand end, the load limiter 11 is connected non-rotatably to the spool 10 via a connecting point 30 which can be designed, for example, as a groove toothing or the like. On the left-hand side, there is a movable bearing 29 between the spool 10 and the load limiter 11, so that the spool 10 is able to rotate in relation to the region of the fixed bearing 28 during corresponding loading owing to forward displacement of the vehicle occupant's body, for example in the event of a crash. The absorption of energy occurring in the load limiter (torsion bar) 11 causes a deformation of the load limiter. The load exerted on the vehicle occupant's body by the seat belt 5 is therefore reduced.

To influence this load-limiting function by addition or subtraction, a torque can be applied to the rotatable spool 10 or the load limiter 11 via a coupling 9. It is also possible to transmit torques to the belt reel 1, in particular the rotatable spool 10 via this coupling 9 for pretensioning and/or power tensioning of the seat belt 5. Processes of this type, during which torques are transmitted via the coupling 9 to the load limiter 11 and/or the belt reel, in particular the rotatable belt part 10, are described in German patent applications DE 199 27 731 A1, 199 40 034 A1, 199 50 855 A1 and in the German patent DE 197 31 689 C2.

The torques to be transmitted are supplied by a rotor 2 on the other side of the coupling. This rotor 2 is mounted rotatably on a bearing journal 14. The bearing journal 14 is connected non-rotatably to the spool 10. In the embodiments illustrated, the bearing journal 14 comprises an axial extension of the load limiter 11 that is a torsion bar. The rotor 2 has a bearing collar. The bearing collar is mounted rotatably on the bearing journal 14. At its exterior, the bearing collar is mounted rotatably in a cylindrical outer bearing 12 formed by an internal bore in an adapter flange 13. The adapter flange 13 is connected rigidly to the retractor frame 3 at fixing points 39.

On the rotor 2 there is also provided a radially extending plane rotor face 43 which rests with an interlocking fit on a correspondingly designed contact face 44 also extending radially with respect to the reel axis 4 on the adapter flange 13. Security against axial displacement in both axial directions for the rotor 2 in the embodiment in FIG. 1 is ensured in the embodiment shown in FIG. 1 by a securing ring 45 (FIG. 1) which is supported on the bearing journal 14 or, as will be described in detail, on the casing 20 and therefore on the adapter flange 13. In the embodiment shown in FIG. 2 a securing disc 32 is provided which rests on a contact face 46 of the adapter flange 13 located on the side of the adapter flange 13 opposite the contact face 44 (FIG. 2).

The bearing journal 14 is also supported by an external securing disc 31 on the exterior of the casing 20 connected rigidly to the adapter flange 13. (FIGS. 2 and 3) In the three embodiments, the bearing journal 14 has, at the end at which is connected to the load limiter 11 and which merges integrally into the load limiter, a peripheral stop 17 in the form of a peripheral shoulder. In the embodiment in FIG. 1, the rotor 2 is secured axially between the securing disc 45 and the peripheral stop 17 and held on the bearing journal 14. As the rotatable spool 10 is connected rigidly to the bearing journal 14 via the connecting point 30 and on a plane contact face 46 which extends radially to the reel axis 4 and rests on the side of the adapter flange 13 opposed to the contact face 44, the belt reel 1 is also secured axially and supported on the adapter flange 13.

An annular carrier 6 guides the coupling elements 7 between a released position and an engaged position is provided in the embodiment shown in FIG. 1. Preferably, the annular carrier is secured against axial displacement on one side by the belt reel and/or the load limiter and on the other side by the adapter flange. This annular carrier 6 is shaped integrally on the end face of the spool 10. The annular carrier 6 is extended beyond the width required for forming the coupling and projects into a correspondingly shaped recess of the adapter flange 13. The extended annular carrier 6 is mounted rotatably in this recess. In the axial direction, the carrier is secured in an interlocking manner by a double needle 33. For this purpose, a peripheral half-round groove is shaped in the extension of the annular carrier 6. The other half of the needle is plugged in rectilinear bores shaped in the adapter flange 13.

The half-round grooves or bores in the adapter flange 13 oppose the peripheral half-round groove in the extended carrier 6 so that a friction-free interlocking connection is achieved in both axial directions during insertion of the securing double needle 33. As a result, perfect support and introduction of the forces which act on the coupling during the transmission of torque and which can lead to a change in the desired position of the coupling, is achieved by and in the adapter flange 13.

In the embodiment shown in FIG. 2, the annular carrier 6 for the coupling element 7 is connected to the spool 10 by a press fit. For this purpose, the annular carrier 6 has a conically shaped peripheral pressed part 47 which is inserted with pressure into the through bore in the spool 10. The connecting point 30 is produced between the pressed part 47 and the load limiter 11 is a torsion bar, for example by wedging teeth or the like. As in the embodiment in FIG. 1, the bearing journal 14 comprises, in particular in the region of the transition to the load limiter 11, a peripheral stop face 17 against which the annular carrier 6 rests. The axial securing of the unit comprising the belt reel 1, the load limiter 11, the annular carrier 6 and therefore the coupling 9 and the bearing journal 14 is effected in one direction by a securing disc 31 supported on the casing 20. As the casing 20 is fastened on the adapter flange 13 the unit is supported on the adapter flange 13 in one axial direction. The unit is supported on the contact face 46 of the adapter flange in the other axial direction. The annular carrier 6 for the coupling elements 7 rests on this contact face 46. As in the embodiment in FIG. 1, therefore, the forces which act during the transmission of torque at the coupling 9 and which could lead to a change of position of the coupling 9 are supported flat on the adapter flange 13 in both axial directions. Optionally, the rotor 2 can be supported with an additional securing disc 32 on the contact face 46 of the adapter flange 13. On the other side of the adapter flange 13, the rotor 2 rests with a radially extending face on the contact face 44 of the adapter flange 13. In cooperation with the securing disc 32, therefore, the rotor 2 is supported on the adapter flange 13 in a radial direction as well as in both axial directions.

Figure 3:
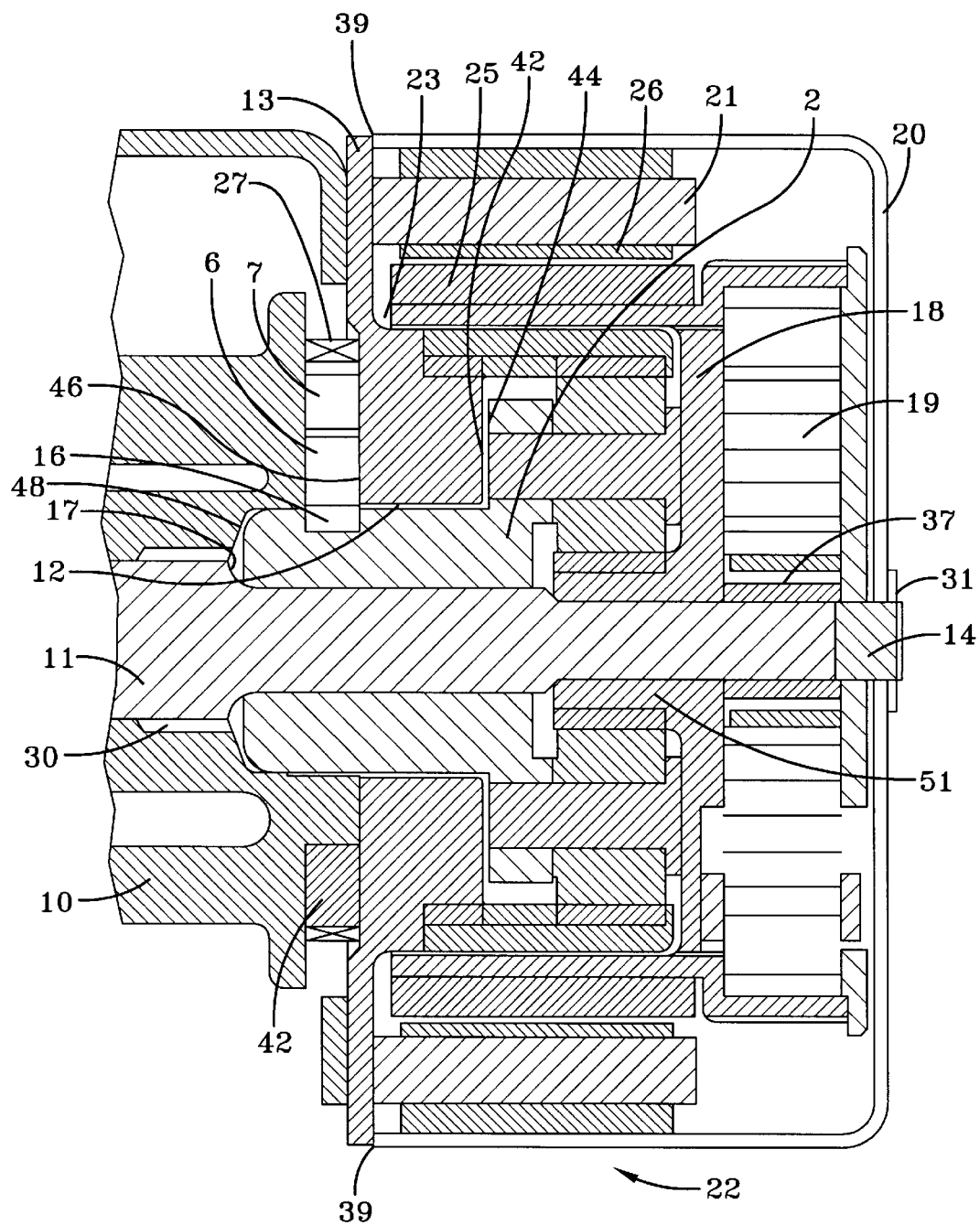
FIG. 3 is a cross-sectional view of a third embodiment of a seat belt retractor.

In the embodiment shown in FIG. 3, the bearing collar of the rotor 2 extends beyond the coupling 9 in the direction of the spool 10. The rotor 2 is supported at the peripheral contact face 17 on the bearing journal 14 or at the transition from the bearing journal 14 into the load limiter 11 and/or on a further peripheral contact face 48 provided on the spool 10 in one axial direction. As in the embodiment in FIG. 2, the bearing journal 14 is supported on the casing 20 rigidly connected to the adapter flange 13. The annular carrier 6 for the coupling element 7 is shaped integrally on the spool 10 and rests flat on the contact face 46 on the side of the adapter flange 13 facing the belt reel 1. As in the embodiments in FIGS. 1 and 2, the unit comprising the belt reel 1, the load limiter 11, the bearing journal 14 and the coupling 9 with its annular carrier 6 is supported on the adapter flange on both sides. For supporting the rotor 2 on the adapter flange 13 on both sides, an additional securing disc 32 which rests on the contact face 46 turned toward the belt reel 1 and is optionally arranged between the annular carrier 6 and the contact face 46 can also be provided as in the embodiment in FIG. 2.

In the embodiments in FIGS. 1 and 2, the torque transmitted from the rotor 2 to the spool 10 or the load limiter 11 is produced by an electric motor 22 preferably a brushless d.c. motor of the type described in detail in DE 43 02 042 A1.

The electric motors 22 in these two embodiments are external rotor motors in which stator poles 26 are arranged on an internal radius on a stator carrier 21 and rotor poles 25 are arranged on an external radius with formation of an air gap 40 on a hood-shaped motor rotor (external rotor) 8. The stator carrier 21 is fastened on the adapter flange 13 and is annular in design. The teeth of a ring gear 34 for forming a planetary gear within the stator carrier are located on the interior of the annular stator carrier. The non-rotatable connection between the annular stator carrier 21 and the adapter flange 13 can be achieved by interlocking engagement of teeth with the teeth extension of the ring gear 34, as shown in FIGS. 1 to 3.

To complete the planetary gear, the rotor 2 is a planet wheel carrier on which planet wheels 35 are rotatably arranged. The planet wheels 35 engage with the ring gear 34 and with a sun wheel 36 formed on a bearing collar 51 of the hood-shaped motor rotor 8. With a design of this type, as shown in FIG. 1, the rotor 2 can also be supported on the casing 20, for example on the interior of the casing 20, via the gear parts and the hood-shaped motor rotor 8 which is supported on the interior of the housing 20 by a pivot bearing 38.

In the embodiment shown in FIG. 3, the rotor poles 25 are fastened on an internal motor rotor 18. The stator poles 26 provided on the stator carrier 31 are located on an external radius. In the embodiments of the electric motors 22 shown in FIGS. 1, 2 and 3, the rotor poles 25 provided on the motor rotors are preferably permanent magnets and the stator poles 26 as field windings. Brushless d.c. motors are preferably used.

Torques can be generated by the electric motors 22 in the embodiments, in order to bring about reversible pretensioning of the seat belt, should the risk of a crash arise (probability of a crash), in order to influence the load limiter 11 by addition or subtraction and to adjust the comfort of the bias produced by the motive spring 19. As already explained, the motive spring 19 acts via the spring core 37 which is connected non-rotatably to the bearing journal 14 and via the connecting point 30 on the belt reel 1. The motive spring can be supported on the adapter flange or a casing fastened on the adapter flange via the motor rotor. For this purpose, the outer fixing point of the motive spring is rigidly connected to the motor rotor and the motive spring preferably acts with its spring core via the bearing journal on the belt reel and/or the load limiter.

Rather than an electric motor force, a torque resulting from an inertial force can also be transmitted via the rotor 2 and via the coupling 9 to the belt reel 1. For this purpose, the rotor 2 can be an inert mass or can be connected rotatably to an inert mass, as described, for example, in DE 199 50 855 A1.

Hall sensors 24, by which the respective rotational angle position of the motor rotor 8 or 18 can be scanned, can be provided on the adapter flange 13. These Hall sensors 24 are so arranged that they are influenced by the magnetic field of the respective rotor poles 25. Preferably, the Hall sensors 24 can be used for controlling switching of the brushless d.c. motor 22. It is also possible when adjusting the bias formed by the motive spring 19 to evaluate the signals from the Hall sensors 24 and to use them for controlling the motive spring force. The motive spring force is adjusted in a known manner by relocating the external fixing point of the motive spring 19 that can be connected non-rotatably to the motor rotor 8 or 18.

A mechanical serration 23 that is supported on the adapter flange 13 and can be resilient in design can also be provided between the motor rotor 8 or 18 and the adapter flange 13. A secure mounting position of the motive spring 19 via the motor rotor on the adapter flange 13 can thus be achieved. The motor rotor 8 or 18 can also be fixed in an optimum starting position which is predetermined in each case by the division ratios of the rotor poles and the stator poles.

Figure 4:
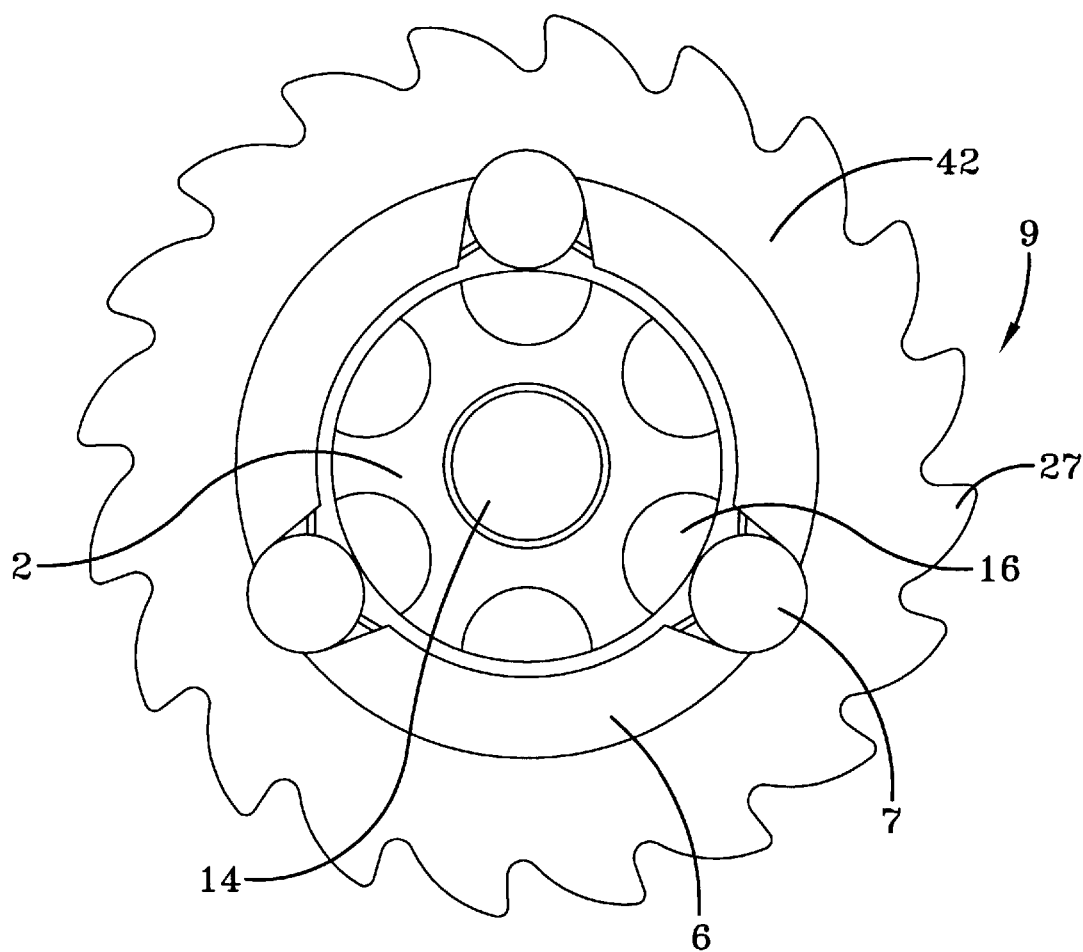
FIG. 4 shows a design for a coupling which can be used in the embodiments of a seat belt retractor shown in the figures.

The mode of operation of the coupling 9 is as follows. If the blocking discs 41, 42 are fixed against further rotation by engagement of a blocking latch (not shown in detail) in the blocking teeth 27, for example in the event of a crash, and the spool 10 is rotated in the belt extraction direction owing to the forward displacement of the strapped-in vehicle occupant's body, the coupling elements 7 are displaced radially inwardly from their normal position shown in FIG. 4 owing to the relative rotation between the spool 10 or the carrier 6 and the fixed blocking disc 42. The coupling elements 7 are displaced radially inwardly into the engagement recesses 16 provided in the bearing collar of the rotor 2. The rotor 2 is therefore coupled to the rotatable spool 10 by the carrier 6. A suitable coupling is known, for example, from DE 196 47 841 A1.

Figure 5:
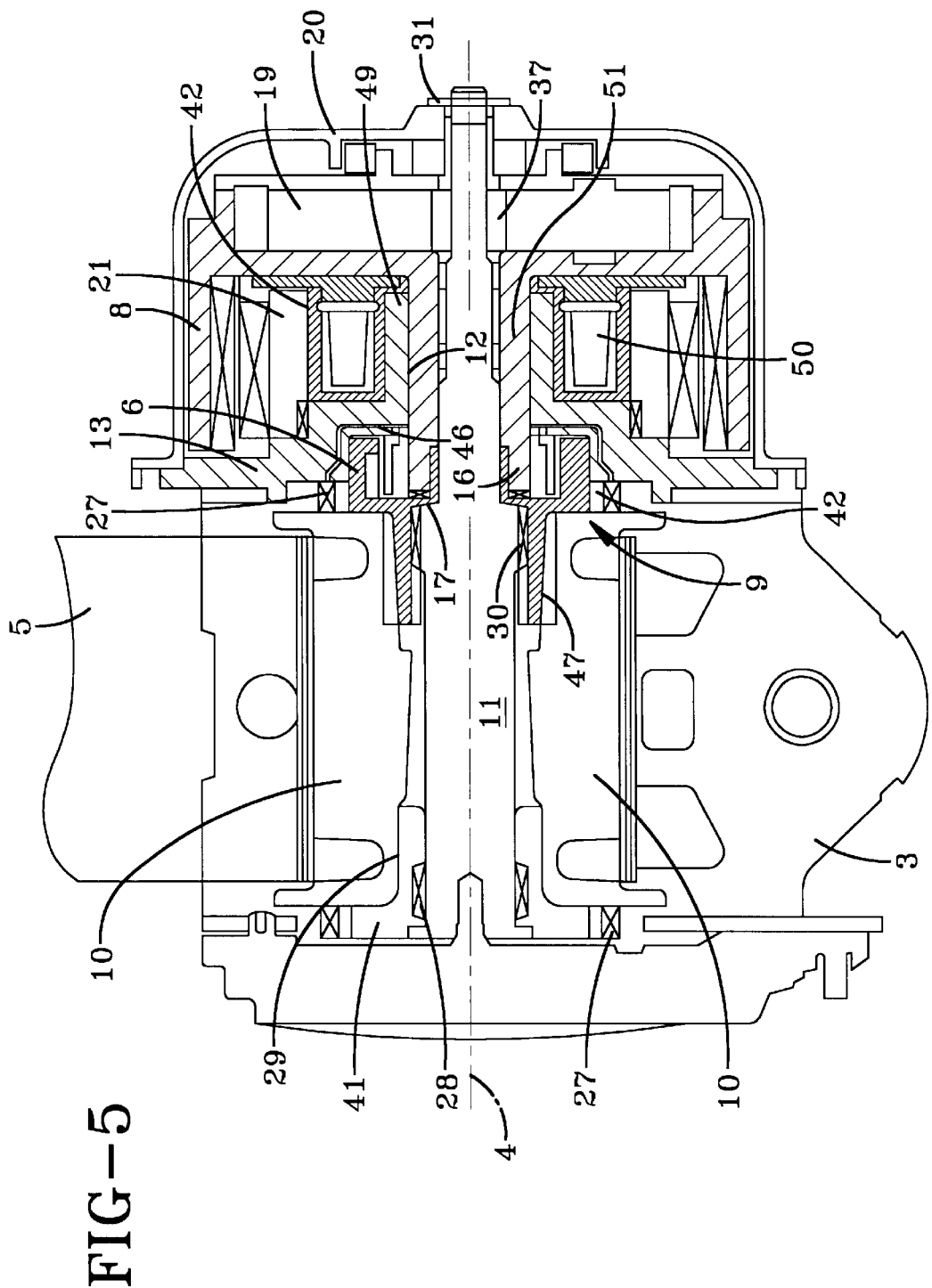
FIG. 5 is a cross-sectional view of a fourth embodiment of a seat belt retractor.

In the embodiment shown in FIG. 5, a damping device 50 with a viscous damping means, for example oil, is provided between the external rotor 8 of the electric motor, and the adapter flange 13. One rotor part projects into the viscous damping means so that the initial torque which the rotor transfers to the rotatable spool 10 or the load limiter 11 is brought into effect in a dampened fashion. In the embodiment illustrated, the damping device 50 is located between the adapter flange 13 or the stator carrier 21 and the motor rotor 8. Instead of the electric motor, the rotor 8 can also act as an inert mass on the rotatable spool 10 or the load limiter 11, as described in DE 199 50 855 A1. A magnetic or mechanical damping medium can be used in the damping device 50 rather than a viscous damping medium.

The rotor 8 is also mounted rotatably essentially by the external bearing 12 provided on a bearing collar 49 of the adapter flange 13 in the embodiment shown in FIG. 5. The coupling 9 and, in particular, the annular carrier 6 of the coupling, is supported axially on the contact face 46 of the adapter flange 13.

Although the invention has been disclosed in connection with a few preferred embodiments thereof, variations and modifications may be chosen by those skilled in the art without departing from the spirit and scope of the present invention as defined by the appended claims.

We claim:

1. A seat belt retractor comprising a belt reel mounted rotatably around a reel axis on a retractor frame and biased by a motive spring, a load limiter non-rotatably connected to a rotatable spool of the belt reel and a rotor that is coupled to the load limiter by a coupling, the rotor transmits a torque generated by an electric motor to the load limiter to influence load limiting function, wherein the coupling comprises an annular carrier connected non-rotatably to the load limiter for guiding coupling elements between a released position and an engaged position wherein the annular carrier is arranged coaxially around a bearing collar provided on the rotor and is supported against axial displacement on both sides of an adapter flange.

2. The seat belt retractor according to claim 1 wherein the annular carrier is connected non-rotatably to the rotatable spool on one side and rests on a radially extending contact face of the adapter flange on its other side.

3. The seat belt retractor according to claim 1 wherein the rotor is mounted internally on a bearing journal extending coaxially to the reel axis.

4. The seat belt retractor according to claim 1 wherein the rotatable spool, the load limiter, a bearing journal and the carrier for guiding the coupling elements between a released and an engaged position form a non-rotatably interconnected unit which is supported on either side of the adapter flange.

5. The seat belt retractor according to claim 1 wherein the load limiter is a torsion bar.

6. The seat belt retractor according to claim 1 wherein a motor rotor of the electric motor is mounted rotatably on a bearing journal.

7. The seat belt retractor according to claim 6 wherein between the motor rotor and the adapter flange a mechanical serration is provided, which is supported on the adapter flange and by which the motor rotor is stopped.

8. The seat belt retractor according to claim 7 wherein the motor rotor is stopped in specific rotational angle positions by the mechanical serration in which a startup of the electric motor is ensured owing to a division ratio of rotor and stator poles.

9. The seat belt retractor according to claim 6 wherein the electric motor is a brushless d.c. motor.

10. The seat belt retractor according to claim 1 wherein the electric motor is a brushless d.c. motor and on the adapter flange there are arranged Hall sensors which are influenced by a magnetic field of the respective rotor poles and which control the switching of the brushless d.c. motor.

11. The seat belt retractor according to claim 10 wherein the bias or restoring force of the motive spring is adjustable as a function of the rotational angle signals of the Hall sensors via a motor rotor acting on an outer fixing point of the motive spring.

12. The seat belt retractor according to claim 1 wherein the force from the motive spring is transmitted via a bearing journal to the belt reel.

13. The seat belt retractor according to claim 1 wherein the rotor is an output shaft of an electric motor.

14. The seat belt retractor according to claim 1 wherein the rotor is a rotor of an electric motor.

* * * * *